US012026823B2

(12) United States Patent
Pagés et al.

(10) Patent No.: US 12,026,823 B2
(45) Date of Patent: Jul. 2, 2024

(54) VOLUMETRIC IMAGING

(71) Applicant: Volograms Limited, Dublin (IE)

(72) Inventors: Rafael Pagés, Dublin (IE); Jan Ondřej, Dublin (IE); Konstantinos Amplianitis, Dublin (IE); Sergio Arnaldo, Dublin (IE); Valeria Olyunina, Dublin (IE)

(73) Assignee: Volograms Limited, Dublin (IE)

( * ) Notice: Subject to any disclaimer, the term of this patent is extended or adjusted under 35 U.S.C. 154(b) by 0 days.

(21) Appl. No.: 17/584,928

(22) Filed: Jan. 26, 2022

(65) Prior Publication Data
US 2022/0245885 A1 Aug. 4, 2022

(30) Foreign Application Priority Data

Jan. 29, 2021 (EP) .................................. 21154369

(51) Int. Cl.
*G06T 15/08* (2011.01)
*G06T 7/10* (2017.01)
*G06T 7/20* (2017.01)
*G06T 7/70* (2017.01)

(52) U.S. Cl.
CPC .............. *G06T 15/08* (2013.01); *G06T 7/10* (2017.01); *G06T 7/20* (2013.01); *G06T 7/70* (2017.01); *G06T 2207/10021* (2013.01)

(58) Field of Classification Search
CPC .............. G06T 15/08; G06T 7/10; G06T 7/70
See application file for complete search history.

(56) References Cited

U.S. PATENT DOCUMENTS

| | | | |
|---|---|---|---|
| 2005/0220349 A1* | 10/2005 | Furuya | H04N 23/63 382/106 |
| 2015/0084950 A1* | 3/2015 | Li | G06T 7/251 345/419 |
| 2019/0318492 A1* | 10/2019 | Kim | G06T 7/60 |
| 2019/0325597 A1 | 10/2019 | Chakravarty et al. | |
| 2020/0074747 A1 | 3/2020 | Deng et al. | |

(Continued)

OTHER PUBLICATIONS

"EPO Search Report/Written Opinion for parent application 21154369.9, mailed Jul. 19, 2021, 10 pages.".

(Continued)

*Primary Examiner* — Yi Yang
(74) *Attorney, Agent, or Firm* — Charles A. Lemaire; Lemaire Patent Law Firm, P.L.L.C.

(57) ABSTRACT

A method for generating a moving volumetric image of a moving object from data recorded by a user-held device comprising: acquiring, from the user-held device, video and depth data of the moving object, and pose data; and communicating the acquired data to a computing module. Then, processing the video data to extract images that are segmented to form segmented images; passing the segmented images, depth data and pose data through a processing module to form a sequence of volumetric meshes defining the outer surface of the moving object; rendering the sequence of volumetric meshes with a visual effect at least partly determined from the video data to form a rendered moving volumetric image; and communicating the rendered moving volumetric image to at least one device including the user-held device. Then, displaying, at a display of the at least one device, the rendered moving volumetric image.

14 Claims, 8 Drawing Sheets

(56) References Cited

U.S. PATENT DOCUMENTS

2020/0226736 A1* 7/2020 Kar ..................... H04N 13/271
2021/0090209 A1* 3/2021 Appleboim ........ G06Q 30/0631
2022/0180594 A1* 6/2022 Guan ................... G06T 7/0002

OTHER PUBLICATIONS

Pages, et al., "Affordable content creation for free-viewpoint video and VR/AR applications", "Journal of Visual Communication and Image Representation", May 1, 2018, pp. 192-201, vol. 53, No. 1.
Pages, et al., "Forge: A volumetric video processing platform for everyone", "internet URL: https://nem-initiative.org/wp-content/uploads/2020/07/4-1-nem2020.pdf>", Jul. 2, 2020, Publisher: Nem Summit 2020 [Online].
Wang, et al., "Outdoor Motion Capture with Sparse Handheld Video Cameras", "IEEE Transactions on Visualization and Computer Graphics", May 1, 2018, pp. 1856-1866, vol. 24, No. 5.

\* cited by examiner

VOLUMETRIC IMAGING

CROSS-REFERENCE TO RELATED APPLICATION

This application claims priority benefit under 35 U.S.C. § 119(a) to European Patent Application 21154369.9, filed 29 Jan. 2021 by Rafael Pagés et al. and titled "Volumetric Imaging," which is incorporated herein by reference in its entirety.

FIELD

The present application relates to a system and method for forming volumetric video i.e. moving volumetric images. In particular, the present application relates to methods and systems for forming moving volumetric images using data acquired by a user-held device.

BACKGROUND

It is now common for users to film and share high-quality video data on user-held devices, such as mobile phones or smart glasses. Such video data is defined by a series of two-dimensional images that are captured by a camera on the user-held device. The video data will be acquired whilst the camera is moving because user-held devices are not fixed in place. Known reconstruction methods can process video data to enable reconstruction of a volumetric image of a static objected that is imaged in the video data.

However, to form an accurate volumetric image of a moving object requires complex, professional imaging apparatus. Such professional imaging apparatus may include many synchronised and/or parameter-harmonized cameras, multiple imaging and depth sensing sensors, complex and/or structured illumination, specialized control hardware and software, and powerful servers for processing the acquired data. Typically, a team of highly skilled operators helps to set-up the data acquisition and to process the data to form the moving volumetric image.

An example of a professional imaging apparatus is described in EP3503030A1, which relates to a method comprising estimating a volumetric image from a plurality of images captured by a plurality of image capturing devices. The method combines silhouette information derived from acquired images with information from a generated point cloud of depth measurements. Another professional imaging system is described in the article "Affordable content creation for free-viewpoint video and VR/AR applications" by R. Pagés, K. Amplianitis, D. Monaghan, J. Ondřej and A. Smolić in the Journal of Visual Communication and Image Representation, 53, 2018, page 192.

Generally, professional imaging apparatus require multiple cameras and are fixed apparatus that are only available to users with large budgets e.g. film studios. The images from such professional imaging apparatus are also typically distributed in a fixed format that cannot be adjusted by users.

Therefore, there is a need to provide a solution for generating volumetric images from moving objects using a user-held device.

SUMMARY

It is an object of the present invention to address how to form volumetric images of moving objects in a manner that addresses at least some of the deficiencies in known methods and apparatus.

The present invention is defined by the independent claims. The dependent claims provide further features that are present in some embodiments of the present invention.

Some embodiments of the present invention relate to a method for generating a moving volumetric image of a moving object from data recorded by a user-held device comprising the steps of:
  acquiring input data, the input data comprising:
    video and depth data of the moving object from at least one sensor on the user-held device; and
    pose data for the user-held device; and
  communicating the input data to a computing module; and
  at the computing module:
    processing the video data to extract images that are segmented to form segmented images that delineate the moving object;
    passing the segmented images, depth data and pose data through a processing module to form a sequence of volumetric meshes defining the outer surface of the moving object;
    rendering the sequence of volumetric meshes with a visual effect at least partly determined from the video data to form a rendered moving volumetric image;
    communicating the rendered moving volumetric image from the computing module to at least one device, the at least one device comprising the user-held device; and
  displaying, at a display of the at least one device, the rendered moving volumetric image received from the computing module.

The advantage of this method is that a single user-held device can be used to acquire the data necessary to form a moving volumetric image. This represents a significant advantage as typically to acquire such data would require a large, complex, professional imaging apparatus. The use of the user-held device is possible due to the specific processing steps that accounts for the varying pose of the user-held device and the combination of the video and depth data when forming the volumetric mesh. The distinct step of delineating the moving object in the video data is also important because it enables identification of the silhouettes of the moving objects. Subsequent processing may then use the delineated outlines i.e. silhouettes rather than the full images and this represents a significant reduction in the load when processing the video data and depth data to form the volumetric mesh. Effectively, the delineation step makes it possible to combine the video data with the depth data without the need to fully analyse and understand what is shown in the video data.

The video data may be acquired from at least two cameras in a stereo-camera configuration on the user-held device, and the depth data is determined from the video data using a depth-from-disparity method. The use of the stereo-camera and the depth-from-disparity method avoids the need for an additional depth sensor to supply the depth data. Furthermore, such methods may obtain depth measurements for all features that are identifiable in two or more cameras of the stereo camera. Many such identifiable features may be very small e.g. 3×3 pixels and located throughout the image. Therefore, a lot of depth data may be generated relative to some other depth data measurement techniques. Using depth-from-disparity methods enable the described volumetric imaging methods to be implemented using user-held devices such as mobile phone having two or more cameras in a stereo-camera configuration without the need for any additional equipment. A significant portion of modern user-held devices, e.g. mobile phones, have two or more cameras in a stereo-camera configuration.

Like the depth data, the pose data may also be determined from the video data. Using video data as a source of the pose data avoids the need for additional sensors in the user-held device. As an example, simultaneous localisation and mapping (SLAM) methods may be used to determine the pose data from the video data. Acquiring input data, e.g. depth data and pose data, from the video data reduces the need for complex equipment and enables users to generate volumetric images using their own user-held devices, e.g. mobile phones, tablets, etc. In addition to the pose data and/or depth data determined from the video data, other sources of input data may be available on the user-held device e.g. pose and depth data from other sensors. In such cases, all the acquired data can be aggregated to increase the available input data and/or improve confidence in the input data. Alternatively, the input data can be obtained from a selection of sources selected from all possible sources of input data. The selection of sources may be based on the availability and/or quality of the input data. The selection of sources may be continuously updated throughout the period of input data acquisition e.g. a dedicated depth sensor may only be activated when the depth data derived from the video data is unavailable or is of low quality.

In some embodiments, communicating the rendered moving volumetric image from the computing module to at least one device comprises:
compressing the rendered moving volumetric image into:
a compressed moving volumetric image; and
one or more visual effects corresponding to the compressed moving volumetric image, at least one of the one or more visual effects being partly determined from the video data; and
communicating the compressed rendered volumetric moving image via a communication network.

According to some embodiments, the computing module may be running on one or more remote servers. Using one or more remote servers means that the processing load, when forming the moving volumetric image, may be lifted from the user-held device that is used to acquire the input data. Since the visual effect is maintained as a distinct part of the transferred compressed image, the visual effect may be edited and changed at a subsequent time. As the visual effect was determined from the video data of the moving object and is supplied with the moving volumetric image, the original visual effect is available to restore the moving volumetric image to its original state. This may be used as a test of authenticity of the moving volumetric image i.e. a confirmation that the moving volumetric image was captured with the rendered visual effect.

Displaying the rendered moving volumetric image received from the computing module may comprise decompressing in runtime the compressed rendered volumetric image and then applying a visual effect to the decompressed volumetric image. Runtime decompression avoids the significant memory footprint that may be required to store the decompressed moving volumetric image. Applying the visual effect to the decompressed image also simplifies the rendering, which is especially important given every device that views the image needs to be capable of performing the rendering.

In some embodiments, the applied visual effect is either the visual effect communicated with the rendered moving volumetric image; or one of a plurality of visual effects that may be stored on the user-held device or received from a remote server. By storing the visual effects on the user-held device, the user is provided the opportunity to quickly adjust the volumetric image. Users may also experiment with different visual effects and save custom sets of visual effects, which help avoid the bandwidth use associated with downloading frequently used visual effects. Storage on the user-held device also helps improve the security of the textures, which may be important in some applications as the visual effects are obtained from video data.

The processing module that forms the sequence of volumetric meshes may comprise a deep-learning model forming module. By using deep-learning, full advantage can be taken of the knowledge within previous acquired data sets. This ensures the volumetric meshes do not represent unreasonable forms i.e. meshes with forms that are significantly different to those in the previously acquired data sets. For example, datasets of human images can be used to train a deep-learning model forming module to produce human shaped volumetric meshes. Deep-learning therefore takes advantage of the prior knowledge that is known about the imaged objects. This also ensures that the formed models are complete even in areas that are not visible in the data used to form the models.

The processing module can be further configured to track mesh elements in the sequence of volumetric meshes to form a tracking map; and to render the sequence of volumetric meshes by mapping the video data onto the mesh elements with the tracking map. Forming a tracking map avoids the need to record the positions of all the mesh elements for every frame. The tracking map efficiently describes motion of mesh elements: some mesh elements may not move or may move in a continuous and stable way. As such, recording the position of the mesh elements that move between frame offers a concise way to describe a sequence of meshes. Mapping the video data onto the mesh elements ensures that the visual effect appears stable and does not slide over the volumetric image as the mesh elements moves between frames.

Mapping the video data onto the mesh elements with the tracking map may comprise passing at least part of the sequence of volumetric meshes, the tracking map, and the video data through a deep-learning visual effects module. The use of a deep-learning visual effects module is advantageous as it ensures that a complete visual effect is formed even if the input video data is missing information that directly maps to a corresponding mesh element. Hence, a complete visual effect of a person can be formed even if data of the back of the person was not recorded by the user-held device. In other words, the knowledge of visual effects associated with different objects, e.g. humans, animal, that deep-learning acquires through training may be used to address any gaps in the video data that is used to form a visual effect from the video data i.e. making a visual effect using deep-learning to allow inpainting of occluded areas.

In some embodiments, the segmentation of the images from the video data may be performed using a deep-learning segmentation module. Such a deep-learning segmentation module is trained using training data that supplies knowledge of the shape of similar objects to the moving object imaged in the video data. From this training data, the deep-learning segmentation module is configured to delineate the outline of the shape of the imaged object. This knowledge of the shape enables the deep-learning segmentation module to produce high-quality and accurate delineation results that are realistic even in the case that the assessed image is of low quality, which otherwise would have been difficult to accurately delineate the outline of the shape.

The moving object that is imaged may be a moving human. This is important as known techniques used for non-human imaging can makes assumptions and errors that the present invention does not. The described volumetric imaging methods ensure the accurate representation of human-shaped objects and human-shaped objects movement, which is not possible with the non-human volumetric imaging techniques of the known solutions. Consequently, moving volumetric image of humans generated from the present methods provide a realistic representation.

Other embodiments relate to a corresponding system comprising:
  a user-held device; and
  a computing module,
wherein the user-held device is configured to:
  acquire input data, the input data comprising:
    pose data for the user-held device; and
    video and depth data of the moving object from at least one sensor on the user-held device;
  communicate the acquired data to the computing module; and
  display a rendered moving volumetric image received from the computing module;
wherein the computing module is configured to:
  process the video data to extract images that are segmented to form segmented images that delineate the moving object;
  pass the segmented images, depth data and pose data through a processing module to form a sequence of volumetric meshes defining the outer surface of the moving object;
  render the sequence of volumetric meshes with the video data to form the rendered moving volumetric image; and
  communicate the rendered moving volumetric image from the computing module to at least one device, the at least device including the user-held device. The advantages of this system correspond to the advantages of the corresponding method, as discussed above.

In some cases, the user-held device comprises two or more cameras configured as a stereo-camera; and the user-held device is configured to acquire the input data from the stereo-camera. With such a device the methods discussed above (depth-from-disparity and SLAM) may be used to acquire the input data. Using input from the stereo-camera avoids the need to use a dedicated depth sensor. However, if other sources of input are available, the input from the stereo-camera can be aggregated with the other sources to improve and/or expand the input data and to assess confidence in the values of the input data. Ultimately, this will improve the quality of the moving volumetric image that is produced.

BRIEF DESCRIPTION OF THE DRAWINGS

Embodiments of the present invention will now be described, by way of example, with reference to the accompanying drawings, in which.

DETAILED DESCRIPTION

Figure 1:
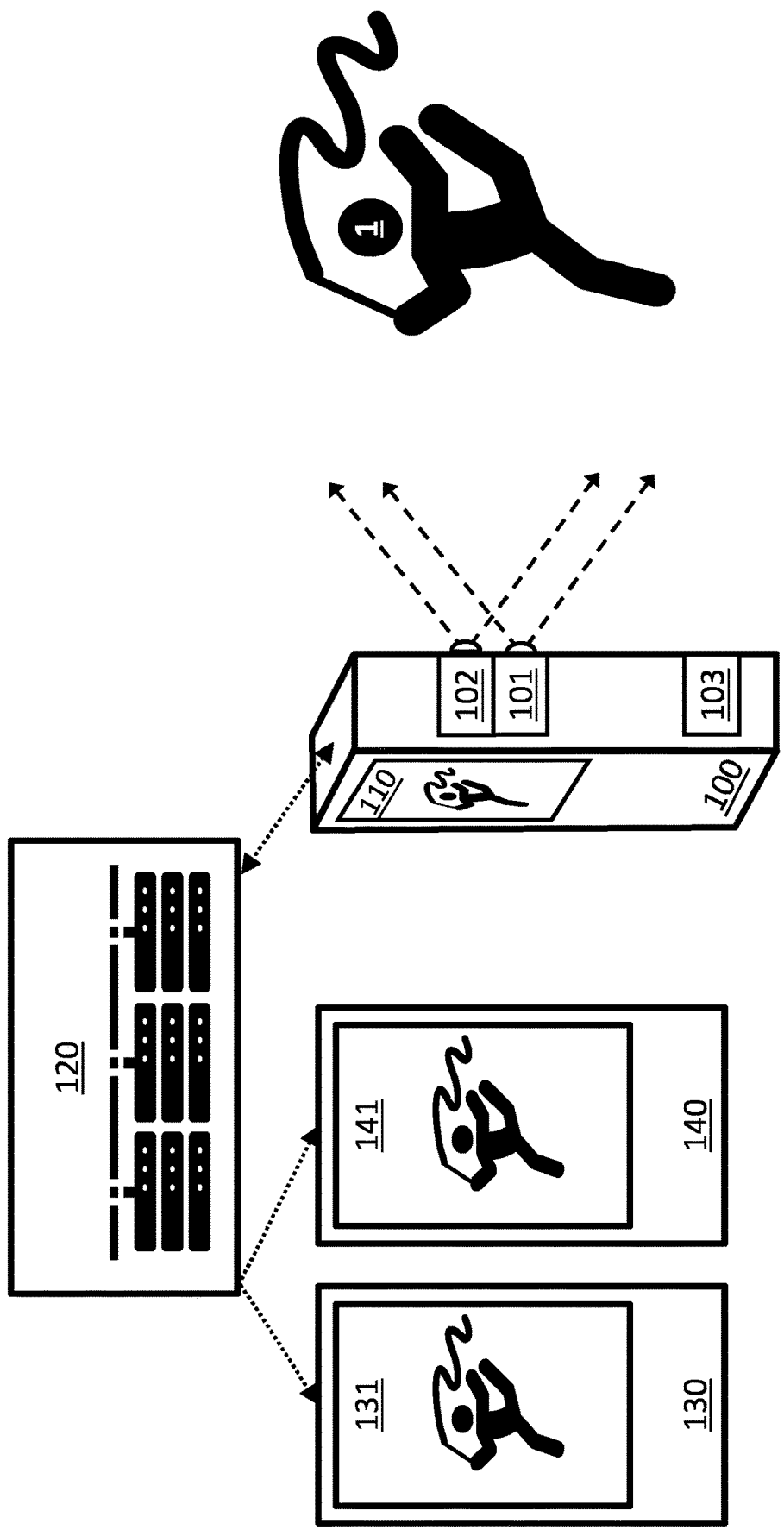
FIG. 1 shows a system for forming, distributing, and viewing moving volumetric images.

FIG. 1 shows an embodiment of the present invention in which a moving human 1 is imaged by a mobile phone 100. The mobile phone 100 has a pose so that a camera 101 field-of-view, FOV, covers scenery that includes the moving human 1. The mobile phone 100 is configured to operate the camera 101 to record video data of the moving human. As the video is being recorded, a display 110 of the mobile phone user may display the video data that is being recorded. The mobile phone 100 is also configured to record depth data for the duration of the video data recording by using a depth sensor 102.

The depth data is produced by the mobile phone and reveals the distance from the mobile phone to one or more points or features in the recorded scene. The data is recorded at multiple times during the recording of the video. Many different depth sensors may be used to provide this depth data. For example, the depth sensors may be based on measuring one or more of: variations in reflected light, distortion in patterns that are projected on to the scenery, acoustic or ultrasonic echo-based measurements, or disparity in images from imaging sensors. It is also possible to produce the depth data by using a deep-learning-based depth-inferring module to infer depth from video data from a single camera on a user-held device. Such a deep module can be trained using previously formed moving volumetric images and their associated video data and/or using results from other depth sensors and associated video data.

In FIG. 1, the depth sensor 102 is formed by a second camera configured in a stereoscopic configuration with the first camera 101. The separation between the cameras 101, 102 is fixed and known. Therefore, the difference in the position of features in corresponding images i.e. the disparity from both cameras 101, 102 can be used to calculate the distance of the features from the mobile phone 100 by triangulation methods e.g. depth-from-disparity methods. Many methods are known to automatically identify and match features for this purpose and the identified features may comprise edges, corners, landmarks, or patterns from small blocks of pixel, e.g. blocks of 9 pixels in a 3×3 configuration.

As the mobile phone is user-held, pose data relating to the orientation and position of the phone is required for the duration of the video data recording. The pose data provides that position and orientation of the mobile phone during video data recording, which serves to allow object motion to be distinguished from motion of the mobile phone. This pose data can be acquired from at least one pose data sensor 103 that supplies positioning and/or orientation sensor. Examples of a sensor that may be used for pose data sensing include a GPS module, an accelerometer, and a gyroscope. In some embodiments, simultaneous location and mapping (SLAM) sessions running on the device allow the pose data to be acquired from the recorded video data.

The recorded video, depth, and pose data represent input data used to form a moving volumetric image of the moving object 1. The mobile phone is configured to transmit this input data via a communication network to a server 120. This communication can take place using any known communication method and over any known network, e.g. a Wi-Fi connection, a mobile phone network, or a wired internet connection.

The server 120, which may be a "cloud", is a computational resource for processing the transmitted data. Any known computational architecture (e.g. distributed computing system, a local cluster, a powerful desktop, one or more mobile phones) that can receive and transmit input data and act as a processing platform may be used as a server 120.

In some embodiments, the moving volumetric image is formed on the user-held device itself 100 without using a server 120. These embodiments have the advantage that the amount of data which is communicated over the network is minimized. The moving volumetric image can even be formed, viewed, and edited at a single user-held device thereby allowing offline operation and ensuring no private data is transferred away from the user-held device, at least before the data is reviewed by the user.

In other embodiments, a server 120 is used to process the input data. In these cases, most of the processing load occurs away from the user-held device 100 that capture the imagery of the moving object 1. This avoids undue load and undue processing on the user-held device 100, which prevents overheating help avoid excessive battery use. The server 120 processes all received input data to form a moving volumetric image.

A volumetric image is distinct from other "3D" images because a user can elect to view a volumetric image from angles that they can vary during viewing. A volumetric image therefore provides a virtual volume that a user can examine from a pose, the pose being adjustable, freely and unpredictably, during the examination.

The moving volumetric image is then transmitted from the server 120 to the mobile phone 100 and to other devices 130, 140. The moving volumetric image can then be viewed on the respective displays 110, 131, 141 of the mobile phone 100 and the other devices 130, 140. If the displaying device has a camera, the moving volumetric image can be displayed as an augmented reality image. In augmented reality images, displayed objects are overlaid on real world imagery from the camera, to augment reality as captured by the camera. If the displaying device is movable, the pose of the camera of the displaying device can be calculated and the display adjusted to give the appearance that a volumetric object is a real object that is being imaged by the camera. In this way, a user of the moving device displaying the moving volumetric image can move around and look at the volumetric image from different angles. Consequently, the moving volumetric image appears to the user like a real object that is being imaged by the camera.

For the case of volumetric imaging of moving humans, it is especially important to form accurate results because viewers are attuned to noticing even small imperfections in human-shaped objects and how human-shaped objects move. Hence, it is significantly more challenging to form a moving volumetric image of a human that looks realistic relatively to any other moving object. Because of the way the moving volumetric images are produced with the present invention, even moving volumetric images of humans produced are realistic.

Figure 2:
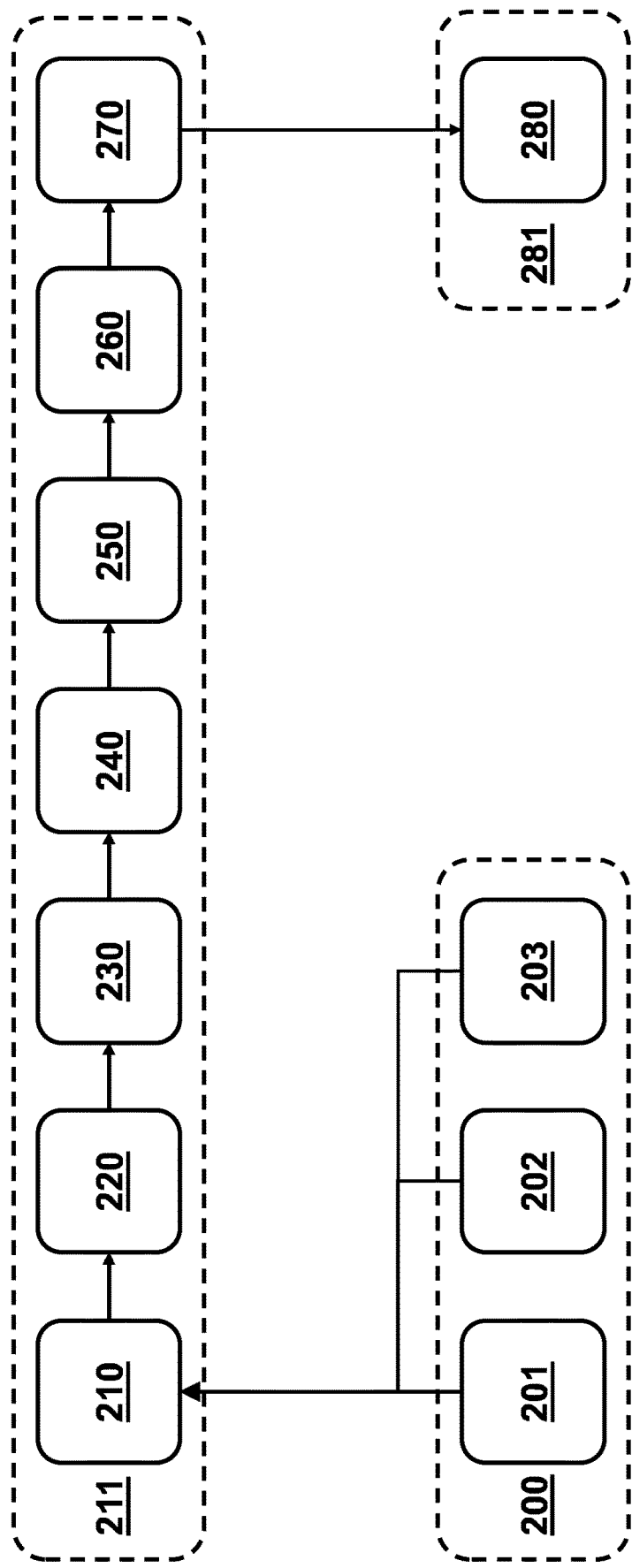
FIG. 2 shows a flow chart of a process to form a moving volumetric image.

The process by which moving volumetric images are produced in some embodiments is explained in more detail in FIG. 2. Moving volumetric images are formed using the data acquired at a single user-held device. The user-held device can however have various types of sensors. For example, the sensors may be one or more imaging sensor such as a camera, a depth sensor based on the reflectance and/or on distortion of an emitted pattern or radiation or sound, accelerometers, gyroscopes. The data of all sensors on a user-held device may be recorded to ensure the maximum amount of information. Alternatively, and depending on configuration, a manual or automatic selection of a subset of the sensors may be used. Input data 200 Is determined from the sensors of the user-held device, at least two types of data are recorded: video data 201 and depth data 202.

Video data 201 can be recorded in various formats and encoding. Video data 201 is any data which can be defined in a sequence of two-dimensional images, with each image corresponding at a particular time. The images from the video data 201 need only contain the information necessary to clearly view the moving object that is to be formed into a moving volumetric image. Therefore, the invention is workable in images that are full colour such as RGB, a selection of colours and/or other wavelengths, or grayscale. Ultimately, the video data 201 helps deduce the form of the moving object 1 and supplies the imagery to allow rendering of a visual effect on to the moving volumetric image.

Depth data 202 can be recorded from one or more dedicated depth sensor on the user-held device, which may use a variety of technology to estimate a depth map, such as measuring the variation or distortion in emitted radiation to map the depth of an imaged scene. It is also possible to produce the depth data by using deep-learning to infer depth from video data from a single camera on a user-held device. Alternatively, the depth data 202 can be deduced from the disparity between images from two imaging sensors, typically cameras. For example, images from two cameras on the back of a smart phone can be compared to map the disparity between the images. Once the disparity is known, as the distance between the cameras is fixed and known, known depth-from-disparity images can be used to produce depth map of the imaged scene. The depth data 202 may be a single image. However, because the imaged object and/or user-held device is moving it will be preferable to have depth data 202 that represents, or can be processed to reveal, a series of depth maps at known times during the recording period of the video data 201. Ultimately, the depth data 202 helps to refine and correct the form of the moving volumetric image.

An optional third type of data that may be recorded is pose data 203. Pose data 203 is any data that reveals the orientation and position of the user-held device. As a user-held device is not fixed in place, the pose data is a time series of measurements that can be used to infer the orientation and position of the user-held device during the time period over which the video data 201 was acquired. In some configurations and with some user-held devices, the pose data is recorded from independent sensors that record positional and orientation, such as such as accelerometer, gyroscopes, electronic compasses, and GPS modules.

Pose data 203 does not however necessarily need to be independently recorded. For example, pose data 203 can be estimated by the apparent size and shape of objects of known size and shape that are imaged in the video data 201. More complex methods are known to derive pose data 203 from video data, such as SLAM methods. Pose data 203 can also be deduced from depth data 202 although video data 201 is preferred as it is typically at higher resolution and has more features. Ultimately, the pose data 203 helps to distinguish between movement of the user-held device and other motion, such as motion of the moving object.

The input data 200 is then transferred and stored in a storage area 210. The storage area 210 may be a storage area on a remote server or "cloud" 211, such as Amazon's S3. Such storage ensures scalability, good data availability, security, and performance. The subsequent formation of the moving volumetric image also happens at the remote server i.e. in the cloud. After the data has been determined and stored, the video data 201 is split into individual images in a splitting module 220.

The individual images are then processed with a segmentation module 230 to form segmented images. In some embodiments, the segmentation module 230 is a machine-learning segmentation module that is designed to delineate the moving object from other scenery. The use of deep machine-learning i.e. deep-learning is especially useful when processing images that do not have enough data in the images to estimate the outline of the object. For example, the video data 201 may comprise an artefact obscuring part of an object in a frame. As a further example, a lens flare may obscure the head of a human in a few images of the video data 201. In this case, by availing of the knowledge imparted in training, the machine-learning segmentation module can still estimate the shape of the human head in the processing images despite the lack of information within the images themselves.

The segmented images are then processed with the depth data in a model generating module 240. The output of the model generation module 240 is a sequence of volumetric meshes. The volumetric meshes are shaped to align to the estimated location of the outer surface of the moving object. Essentially, the model generating module 240 deduces the form of the outer surface of the moving object. The production of meshes ensures that the resultant object is smooth and helps to reduces the risk of imaging artefacts. In a preferred embodiment, the model generating module 240 is a machine-learning model generating module 240. Preferably, deep-learning is used to form the meshes to ensure that the resultant meshes are shaped appropriately and without imaging artefacts or unrealistic voids or sharps protrusions.

The sequences of volumetric meshes are then processed with a volumetric sequence tracker 250 to track the mesh elements of the volumetric meshes across the sequence and form a volumetric tracking sequence. The result is similar to a map of motion of the outer surface of the moving object. The deduced map can be processed to smooth unnatural movements and to avoid motion artefacts. As the changes between meshes are then known, this information with the location of each mesh element in at least one mesh is enough to fully describe the sequence of meshes. Recording the map of motion and one mesh typically requires a lot less memory than recording the full position of each mesh element in each mesh in the sequence of meshes. Therefore, the output of the volumetric sequence tracker 250 may be considered as the sequences of meshes in a memory-efficient encoding.

The output of the volumetric sequence tracker 250 is then processed with the video data 201 with a visual effect module 260 that provides a render of a visual effect on the sequences of meshes.

A visual effect comprises a shader that provides the texture for the sequence of meshes. Each visual effect may therefore be considered as providing the material data that is rendered on to the sequence of meshes. Visual effects are not however limited to shaders and may also comprise additional 3D model elements to be added to the mesh, as described below.

It is unlikely the video data 201 will have enough information for all the mesh elements in any mesh in the sequence of meshes. For example, if the user-held device recorded the moving object substantially from one side the recorded data will not have information on the other side. Therefore, the video data 201 itself will not be enough to render the mesh elements corresponding to the other side of the sequence of meshes. Depending on the configuration, the visual effect can be extrapolated or filled in with default values. In a preferred embodiment, a machine-learning module can be used. Preferably, deep-learning is used to intelligently estimate the correct visual effect. If we consider the example of a patterned jumper on a moving person that is only imaged from the front, deep-learning will likely correctly derive the visual effect for the rest of the jumper. The output of the visual effect module 260 is a fully rendered moving volumetric image.

The rendered moving volumetric image is then compressed in a compression module 270. In some embodiments, the compression results in data that comprises two distinct parts: a visual effect for the moving volumetric image, and a compressed moving volumetric image. The visual effect is the visual effect that was determined by the visual effect module 260—the visual effect that was derived from the video data. By keeping the visual effect as a distinct part in the compressed result, the visual effect may be subsequently adjusted if necessary. The compression which may include encoding is performed using known compression and/or encoding methods.

Once compressed, the rendered moving volumetric image, is suitable for distribution over a network. Therefore, the compressed rendered moving volumetric image is then communicated to one or more device 281 that have a viewing module 280. The viewing module 280 lets users of the one or more devices 281 view the rendered moving volumetric image as an isolated independent rendered moving volumetric image or as part of an augmented reality display. The users can also adjust the rendering and share the results with other users.

Figure 3:
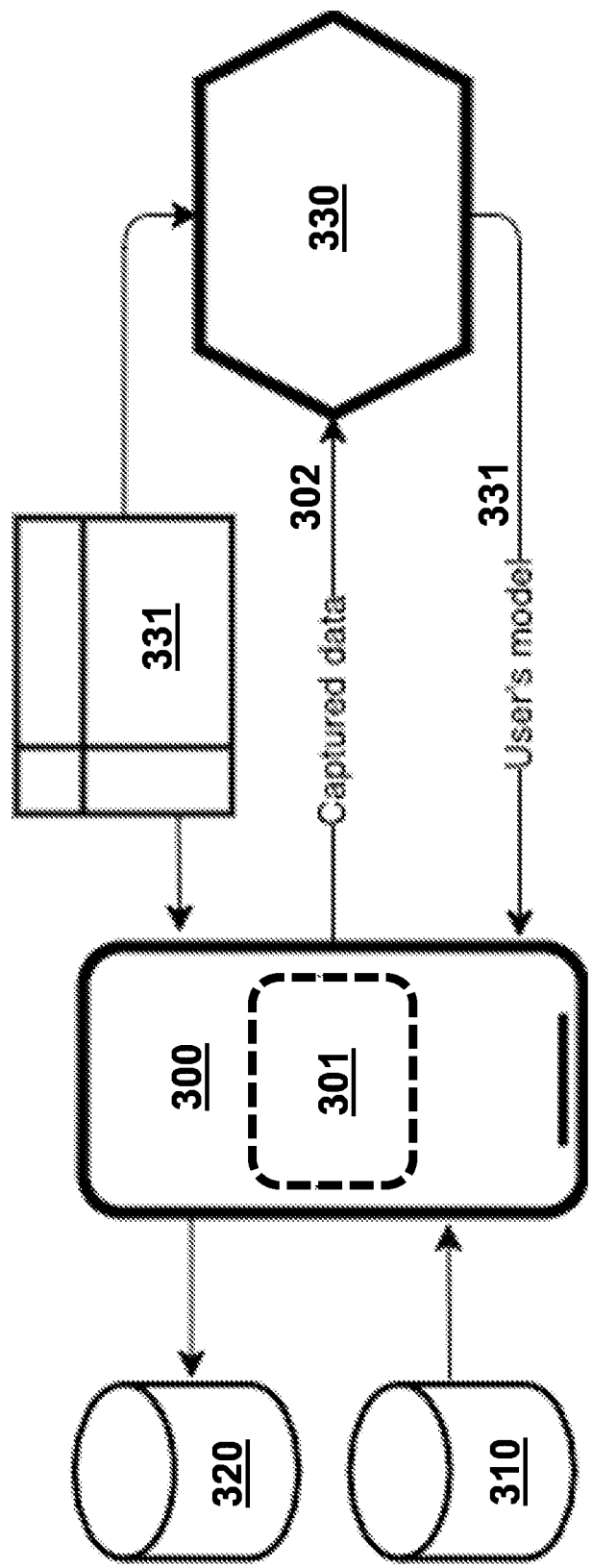
FIG. 3 shows a system for acquiring, forming and viewing moving volumetric images.

Selected aspects of this system and method will now be described in more detail. FIG. 3 shows an example of a system for forming and viewing a volumetric image. In this figure, a mobile phone 300 is running an application 301. The application 301 can be installed into the mobile phone 300 in any known way, such as downloading and installing from an online marketplace. The application 301 set-ups or permits access to a user profile database 310, which comprises the user profile and settings. The user profile database 310 comprises the credentials to access storage areas for storing data such as data acquired from sensors on the mobile phone 300 and storing or accessing moving volumetric images. The storage areas will comprise space on the mobile phone 300 to view a moving volumetric image and may comprise space on computing device, such as a remote server for forming a moving volumetric image.

The application also connects to a user analytics database 320. User analytics information that is recorded by the application is stored in the user analytics database 320. This information permits the application to be updated in response to user usage patterns. As an example, the application 301 may comprise a number of predetermined visual effects that the user can apply to moving volumetric images. If analysis of aggregated usage data from multiple user analytics databases reveals one effect is unpopular, the unpopular effect can be replaced. In another example, the popularity of a moving volumetric image amongst users may be used to infer the quality of the moving volumetric image, which can be used to adapt and tweak the reconstruction methods or application 301.

As described above, the application 301 is configured so that a user can use it to record data from multiple sensors of a moving object. This captured data is generally transmitted 302 via a communication network to a storage area in a remote server 330 for forming the moving volumetric images. The storage area is accessed using a credential from the user profile database 310.

The remote server 330 has access to configuration setting 331 which specify the parameters and modules by which the received data will be processed. The application 301 may also supply additional data with the captured data to request further additional configuration of the processing. The additional data may include further details about the user such as additional authorization to use additional processing. In this way the remote server 330 can be adapted so prioritize processing of data according to user usage patterns or user authorisation. For example, if a user has sent an excessive amount of captured data in a set period, the processing of the data of another user can be prioritized.

Once the remote server 330 has formed the moving volumetric image, the captured data may be retained or deleted according to the configuration of the system. The moving volumetric image is transmitted 332 back via a communication network to the mobile phone 300. The application 301 on the mobile phone 300 can then display the moving volumetric image. Generally, absent a user request and assuming space remains available, the moving volumetric image is retained on the remote server 330 and/or mobile phone 300 so the user can further share the moving volumetric image with other users.

Figure 4:
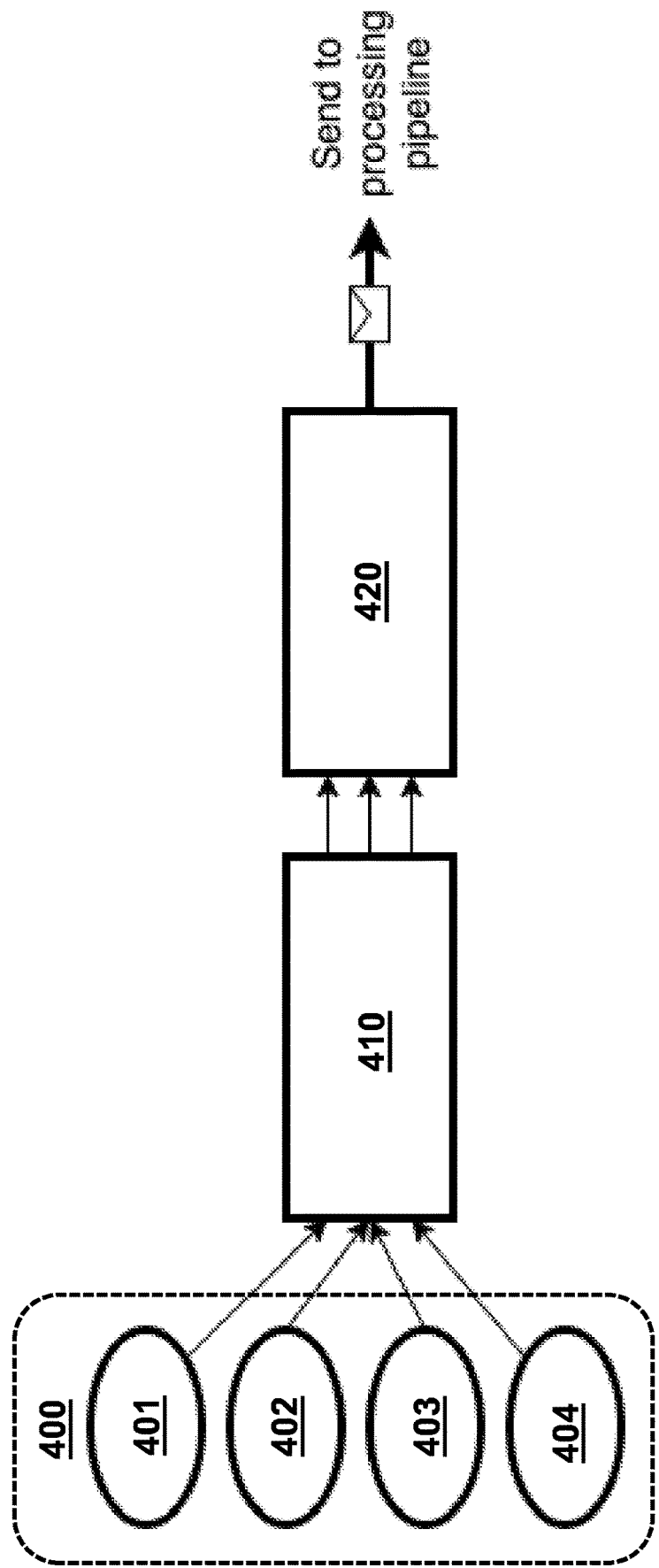
FIG. 4 shows the flow of data that is captured at a device of the system of FIG. 3.

FIG. 4 provides an example of how the application 301 of FIG. 3 may have captured its data. The application interacts with the mobile phone I/O interfaces 410 to determine input data 400. The input data comprises video data 401 recorded from the one or more cameras of the mobile phone 300. The sensitivity of the cameras used in embodiments of the invention need not be limited to any specific range of wavelengths but most commonly it will be used with cameras that are sensitive to visible light. Either camera will generally be in the form of a camera module comprising a lens and a sensor, the lens serving to focus light onto the sensor. The camera module may also comprise electronics to process acquired images. The processing can be low level image signal processing, for example, gain control, exposure control, white balance, denoise, etc. and/or it can involve more powerful processing.

The input data further comprises depth data 402. The depth data 402 may be obtained from a depth sensor present on the mobile phone or estimating using multiple videos from multiple cameras on the mobile phone or any other technique. In some embodiments, multiple methods can be used to determine the values forming the depth data 402.

The input data further comprises depth confidence data 403. The depth confidence data 403 is data that provides the estimated accuracy of the depth values in the depth data 402. The determination of this data may be from a reported uncertainty in the reported depth values and/or from the assessment of the variation in depth values in space and time. In the case that multiple methods are used to determine the values forming the depth data 402, the variation between the reported values between the different methods can be used to determine or refine the depth confidence data.

The input data further comprises pose data 404. The pose data 404 provides the camera positions and orientations for the time period over which the video data is acquired 401. As explained above it can be provided by dedicated pose sensors e.g. accelerometer and gyroscopes. In some embodiments, the pose data is at least partially determined by a standard SLAM module.

These four types of data may be determined from the same source. As an example, a user may take a video of a dancing friend using two cameras, in a stereo-camera configuration, positioned on the back of the mobile phone. The video stream from one of the cameras provides the video data 401. The depth data 402 is determined processing pairs of images recorded at the same time for both cameras and using depth-from-disparity methods. The depth confidence data 403 can be obtained from the numerical uncertainty in the depth-from-disparity methods and comparison of the depth data 402 results across time and space i.e. an individual depth value with a wildly fluctuating value would mean low confidence in the depth value.

SLAM methods are known computational methods by which imaging measurements are used to form and update a map of an imaged environment. Such methods are often used to estimate the pose of a device with imaging sensors. SLAM methods typically require a measurement to provide an absolute scale to the imaged environment. The measurement could be provided by another sensor e.g. by determining an absolute movement from accelerometer reading or an absolute change in orientation from a gyroscope. The absolute scale can also be estimated by the appearance of objects of known size and form.

The video data 401 can therefore by processes using a SLAM method to determine the pose data 404.

When multiple sources of the data are available these can be combined to produce more reliable data. For example, first depth data obtained from a depth sensor for autofocusing a camera might be combined with second depth data obtained from depth-from-disparity processing of two camera to produce the depth 402. The depth confidence data 402 could then be determined from the reported uncertainty in both depth measurement method, the difference between the values obtained by depth measurement method, and the spatial and temporal variation of the depth measurements.

After it is obtained and/or determined, the input data 400 processed to a computational module 420 that processed and compresses the input data. The processing may include data conditioning to remove clearly erroneous or spurious values. Once the processed data has been compressed using known compression methods it is sent to a processing pipeline for forming a moving volumetric image. As an example, the processed and compressed input data may be communicated over a communication network to the cloud 211 shown in FIG. 2.

Figure 5:
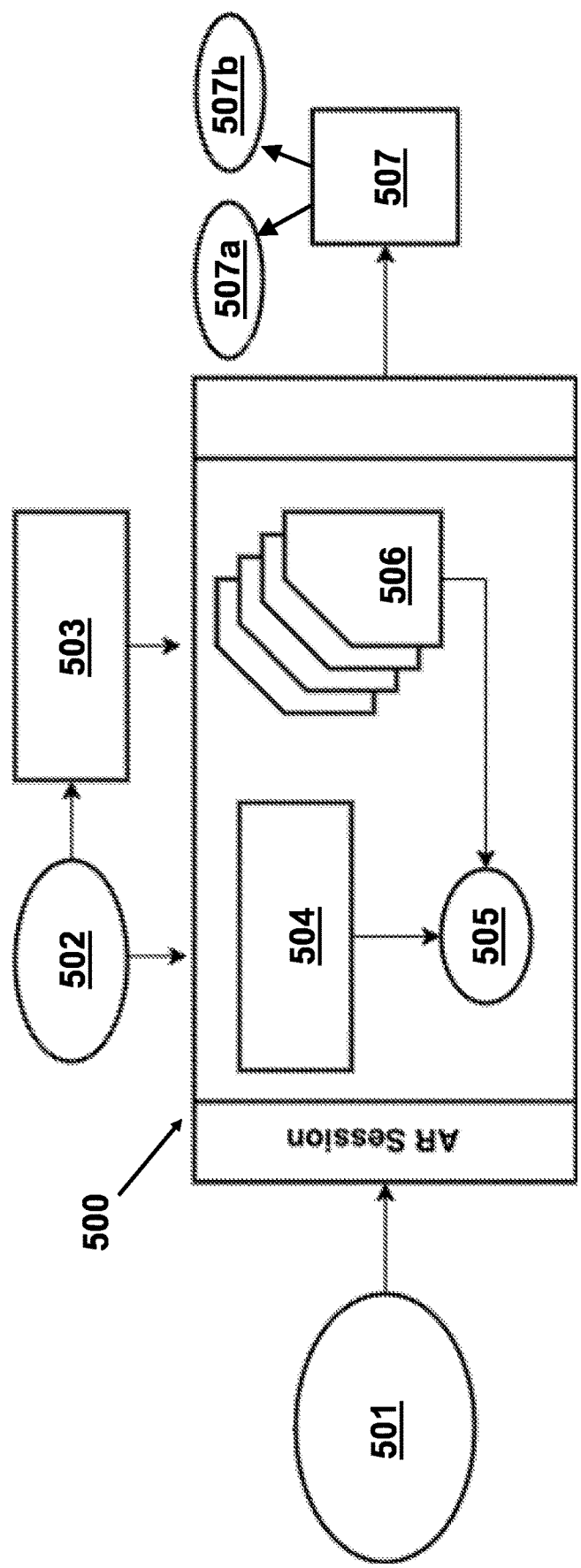
FIG. 5 shows a flow chart of the process to view a moving volumetric image.

Once the processing pipeline has formed the moving volumetric image, as described in FIG. 2, it is issued to a user device. The processing and displaying of the compressed moving volumetric image 501 at the receiving device are shown in FIG. 5.

On receipt of a user request to view a moving volumetric image 501, a viewing application 500 is activated. Activation may include launching the viewing application 500 or, if the viewing application 500 is running in the background or is part of a separate application, surfacing at least part of the viewing application 500 or separate application. The viewing application 500 may be part of an application that is used to form moving volumetric images.

The compressed moving volumetric image 501 is loaded into an augmented reality session. An augmented reality session forms a virtual environment generated by the combination real world imagery and simulated imagery. The augmented reality, AR, is displayed to a user via one or more displays. For example, the one or more displays may be the screen of a mobile phone, or two different displays each of which is projected into a respective eye of a user wearing a 3D headset. The viewing application 500 providing the AR session receives live video data 502 of the real word, i.e. a live camera feed, and pose data 503 to estimate the pose of the sensor providing the video data 502.

The viewing application 500 receives a compressed moving volumetric image 501 which is decoded and decompressed by a decompression module 504 at runtime. The received compressed moving volumetric image 501 may have been recorded by the user of the viewing application 500, shared by another user, or acquired from a remote server. The received compressed moving volumetric image 501 may not have been produced by the presently described methods. For example, it could have been produced by a film studio using a large professional imaging apparatus.

The decoding and decompression results in a rendered volumetric image for each video frame of the moving volumetric image. Each volumetric image can be displayed sequentially to form a moving volumetric image 505. Unlike a normal video, the moving volumetric image can be viewed from any pose i.e. it is a moving volumetric image. The current pose of the sensor providing the video data 502 can be determined from the pose data 503. The current pose is used to synthesis a view of the moving volumetric image. This synthesis is a dynamic process. In other words, a user can move the device around the moving volumetric image as it moves. For example, if the moving volumetric image is a dancing human the user can walk in a circle keeping their user-held device pointed at the dancing human to examine the dancing human from all directions. The user may also raise and lower their user-held device to view the moving volumetric image of the dancing human from higher or lower poses. Similarly, they can approach the dancing human or move away from the dancing humans to view the dancing human from relatively close or relatively distant locations. As the view is synthesised dynamically, even with user movement, the moving volumetric image appears the same as a similar real moving object would appear. Typically, the realistic moving volumetric image is overlaid on the video feed 502 making it appear as if the moving volumetric image is a real moving object in the imaged environment i.e. an AR environment.

As described above, the visual effect is a distinct part of the compressed moving volumetric image. The received visual effect is the visual effect that was determined when originally formed the moving volumetric image.

The viewing application 500 also has access to a plurality of predetermined visual effects 506. The plurality of visual effects 506 are typically stored on the user-held device running the viewing application 500. The plurality of visual effects can be adjusted by administrators of the viewing application 500 or by the user. For example, the user may save the visual effect from a recently received moving volumetric images for later use. The user may also edit visual effects and/or form new visual effects to add to the plurality of visual effects. Similarly, the viewing application 500 may be updated to release new visual effects or edit existing visual effects. Users or administrators of the viewing application 500 may share visual effects with another user. In some embodiments, an external marketplace may be accessed by users to distribute or acquire visual effects. As with the received compressed moving volumetric images, a received visual effect may not have been produced by the presently described methods. For example, a received visual effect could have been produced by a professional film studio or a graphical designer.

A user of the viewing application 500 may select one or more of the plurality of visual effect that are accessible by the user to replace the visual effect currently rendered on the moving volumetric image. Visual effect may comprise shaders and 3D models. For example, a visual effect may include a 3D model of a bowler hat. If this visual effect is applied to a moving volumetric image of a human without a hat, the rendered moving volumetric image will display a human appearing to have a bowler hat.

The viewing application 500 allows users to save received compressed moving volumetric image 501 and/or visual effects. The viewing application 500 also users to distribute a moving volumetric image and/or a visual effect. These may be distributed separately or together. The distribution can occur via other platforms. For example, a moving volumetric image or a link to the moving volumetric image may be shared via social media. In some embodiments, the distributed items may be limited to prevent users modifying them or to restrict access e.g. to stop further editing and/or sharing.

The viewing application 500 may also be used to capture displayed content 507, such as a photo 507a or to capture video 507b of a moving volumetric image or an AR environment. These captured photos and videos may also be distributed, optionally along with moving volumetric images. The captured photos and videos are stored in standard formats and can be used in many known systems to display and let users quickly find moving volumetric images of interest.

Figure 6:
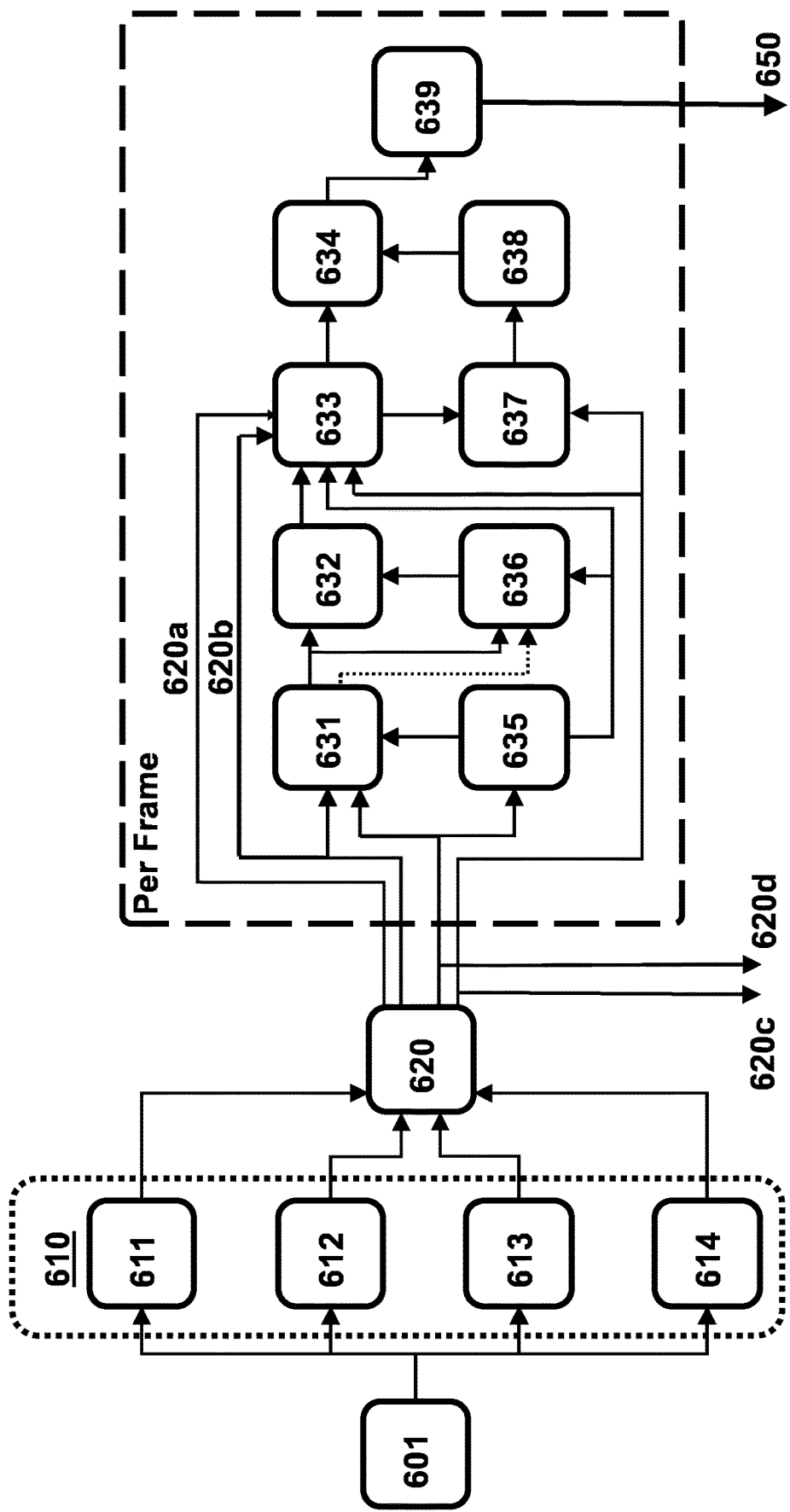
FIG. 6 shows a part of a flow chart of the process to form a moving volumetric image.
Figure 7:
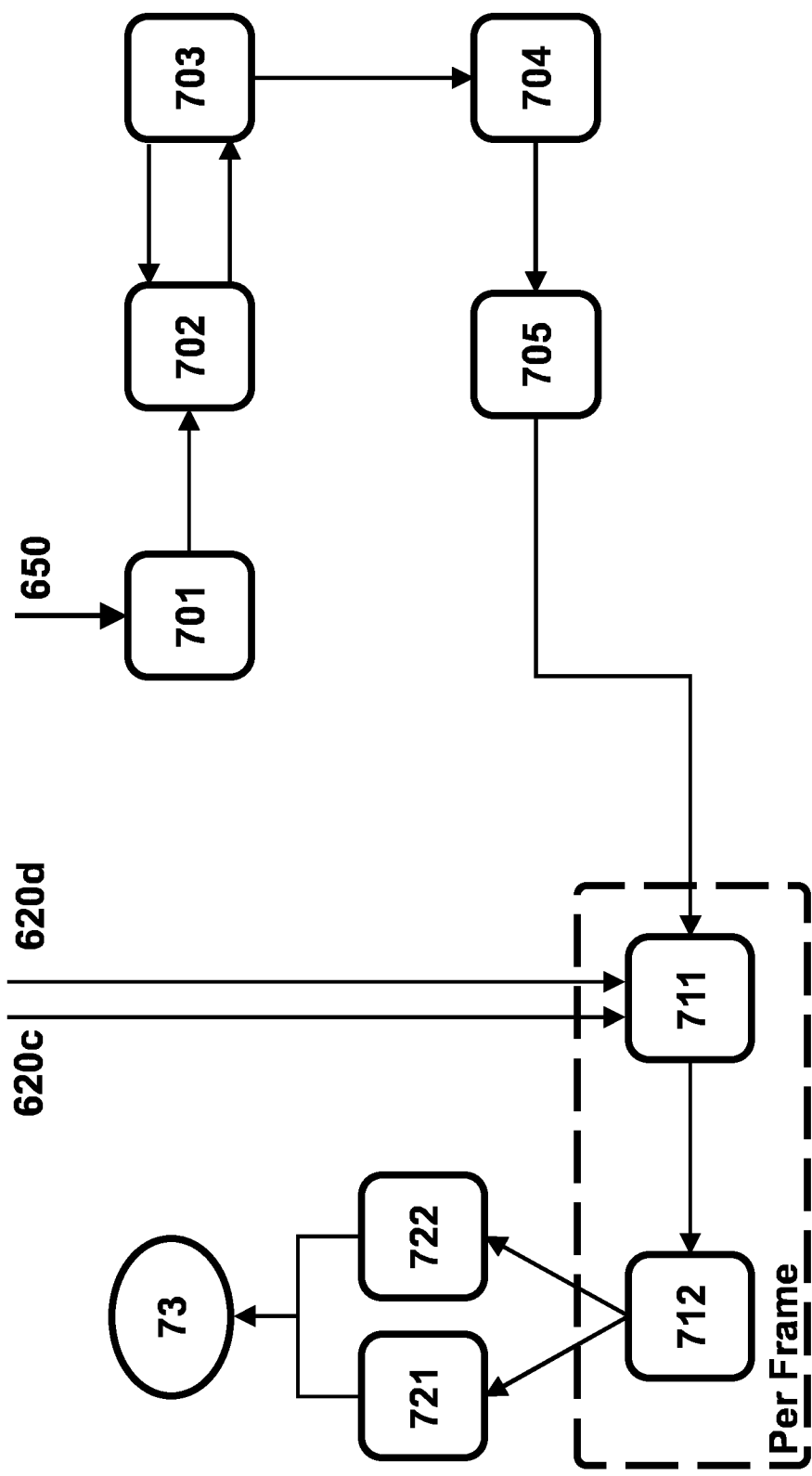
FIG. 7 continues from FIG. 6 and shows another part of the flow chart of the process to form the moving volumetric image.

FIGS. 6 and 7 explains an example of the method to form a moving volumetric image from a single user-held device. For this example, the method is described by reference to forming an image of a moving human but the method may also be used for other objects.

Relatedly, the term "a moving object" should not be considered to be limited to a single continuous object. In some cases, the imaged moving object may comprise multiple disconnected, possibly independently moving, parts. As examples, a moving object might comprise a person juggling three balls or two people dancing side-by-side. Applying the disclosed methods with these examples would result in a moving volumetric image of a person juggling three balls; or two people dancing side by side respectively.

The method starts with an optional decompressing and data preparation step 601. This step forms and/or conditions input data 610. For this example, the input data 610 comprises video data 611, depth data 612, depth confidence data 613, and pose data 614. This input data is split by splitting module 620 into data that is relevant to the time periods corresponding to frames of the video data 611. As an example, the pose data 614 may be split to determine the camera pose during the 10th frame of the video data 611.

For each frame, there are four data streams output that provide configuration information 620a, depth information 620b, image information 620d, and calibration information 620c. The calibration information 620c may be considered as the previously described device pose information.

Next, for each frame, the processing proceeds as shown in the dashed box in FIG. 6. A machine-learning human segmentation module 631 receives the depth information and the image information. The received information is processed to delineate the mask of the imaged moving human figure. In other words, this module 631 serves to identify the silhouette of the human in each image to form a masked image. The masked image is used to filter and/or refine the depth information. The output is a masked image and masked depth image (the masked depth image is the dotted arrow in FIG. 6). The masked image is passed to a machine-learning visual effect inference module 632. The masked image and masked depth are passed to a machine-learning volume generation module 636. In an optional step, the masked depth or the received depth information may be processed to fix and rescale the depth information. In some embodiments this is achieved using super-resolution techniques. Both machine-learning human segmentation module 631 and machine-learning volume generation module 636 are preferably deep-learning modules as this allows knowledge of human shaped objects to be learned and used to improve the quality of the results.

The image information is also processed by a human detector module 635. The purpose of this module is to identify a bounding region that contains the image relating to the imaged human. Many techniques are known for this purpose in machine vision. In other embodiments, for forming moving volumetric images of other objects, the human detector module 635 is replaced by an object detector module which identifies the imaged object. The determined bounding box is passed to the machine-learning volume generation module 636 and to a depth-aware global transformation and refinement module 633.

The machine-learning human volume generation module 636 determines a volumetric image of a human from the received information. The machine-learning human volume generation module 636 receives the bounding box, the masked depth image and the masked image. A volumetric mesh is then formed by the machine-learning human volume generation module 636 representing the volume of the imaged moving human. The volumetric mesh comprises mesh elements which are typically triangular though other shapes are possible. The mesh elements define the outermost surface of the imaged human. The output of the machine-learning human volume generation module 636 is a volumetric mesh that is passed to the machine-learning visual effect inference model 632.

The machine-learning visual effect inference module 632 uses machine-learning to determine the visual effect that is to be rendered on to the volumetric mesh. Preferably, the machine-learning visual effect inference module 632 is a deep-learning module. As the received information may not comprise imagery from all images, it is possible that there is no information received that can be mapped to a part of the mesh. The use of deep-learning allows the system to interpolate and extrapolate from the received information and the trained data to fill in this missing information and thereby produce a higher quality visual effect. The machine-learning visual effect inference module 632 therefore estimates visual effect of the volumetric image even in hidden areas (i.e. Deep Texture Inference). In operation, the deep-learning visual effect inference module 633 receives the masked image and the mesh from the deep-learning human volume generation module 636. The output of the deep-learning visual effect inference module 633 is a volumetric image that is fully textured i.e. coloured and is geometrically complete.

The output volumetric image of the deep-learning visual effect inference module 633 does not have a global position that is correlated with the real world. Furthermore, it can have local scaling and translation errors due to perspective ambiguities produced by the processing of data that is all captured at the same pose.

The output volumetric image is refined by passing through four refining modules: the depth-aware global transformation and refinement module 633, a depth-aware and epipolar non-rigid mesh transformation module 634, a seed deformation graph generation module 637, and a deformation graph propagation module 638.

As seen in FIG. 6, the output volumetric image is first passed to the depth-aware global transformation and refinement module 633 with the calibration information, bounding box and the depth information and depth confidence information. From this input, the translation and refinement module 633 determines a global position and performs local refinement. This output of the translation and refinement module 633 is then passed to a depth-aware and epipolar non-rigid mesh transformation module 634 and to a seed deformation graph generation module 637. The seed deformation graph generation module 637 also receives the calibration information 620c as input. The output of the seed deformation graph generation module 637 is processed by the deformation graph propagation module 638 and then passed to the depth-aware and epipolar non-rigid mesh transformation module 634.

These four refining modules use a very specific selection of known techniques to determine the absolute position of the volumetric image and to address local errors in the volumetric image. This is achieved by a multi-stage process that accounts for the pose of the user-held device and the depth information and depth confidences information. The result is a complete global and local alignment and the definition of a deformation graph based on a sparse set of high confidence depth values. This deformation graph is densified through a level-based propagation algorithm applied across the topology of the mesh. The refined volumetric image is then, in the depth-aware and epipolar non-rigid mesh transformation module 634, transformed using a non-rigid algorithm that is guided by the deformation map and is refined using epipolar constraints. The output of the depth-aware and epipolar non-rigid mesh transformation module 634 is a refined volumetric image.

The refined volumetric image is passed to a mesh decimation module 639 that serves to decimate the received volumetric image using a standard edge collapse decimation method to match the polygonal resolution to a required or predetermined resolution. When the required volumetric meshes have been processed, the output can be aggregated into a sequence of meshes 650. This is then processed as shown in FIG. 7.

The resultant sequence of meshes 650 first undergoes a registration process. This process allows for the reusing of mesh topology across the subsequence of meshes 650, and also reduces flickering and other noise introduced that might otherwise be introduced if the moving volumetric images was produced individually on a frame-by-frame basis.

As shown in FIG. 7, the process comprises the sequence of meshes 650 being received into a similarity module 701. The similarity module 701 performs a neighbour similarity analysis to compare each mesh of the sequence of meshes 650 with each other to determine a similarity score. Meshes with a similarity score satisfying a criteria, such as exceeding a threshold are grouped together into mesh tracking regions in a tracking module 702. The tracking module tracks regions of the mesh and defines a key frame. The tracking module interacts with a registration module 703 to allow mesh elements that are assigned to the same region to be aligned. The registration module preferably uses a full non-rigid registration method. After each registration process, the tracking module 702 and registration module 703 measure the performance of the registration. This performance can be assessed by several methods such as comparing the result with the original target mesh and measuring a difference between the meshes. The difference can be a mesh distance metric which assigns a score to define the overall difference in the mesh elements in the region. If the distance between the meshes exceeds a criteria or threshold, the tracking region is split i.e. the number of mesh elements in a region is reduced and the process repeats.

Once the registration module 703 has achieved an acceptable result. The result in output. In some configurations, the result may be output after a predetermined number of registration iterations. The output is passed to an optional smoothing module 704. The smoothing module 704 uses known 3D smoothing techniques to further reduce any remaining high-frequency components in the sequence. In some embodiments, vertex positions with high instability across a tracked region are smoothed using a 3D Kalman filter.

The registered and optionally smoothed results are passed to an unwrapping and projection module 705. In the unwrapping and projection module 705, each tracked region for selected meshes of the sequence of meshes, is unwrapped and projected onto a different space. The selected meshes typically correspond to key frames, which are frames that provide all their information without reference to another frame. As an example, a keyframe model in each tracked region may be unwrapped using d-charts, or any other mesh segmentation algorithm. The unwrapped region is then projected onto a UV (two-dimensional) space.

For each mesh i.e. frame of the sequence of meshes, a visual effect can then be mapped to the projected space. This can be done as shown in FIG. 7, in which the projected space for a frame is received into a texture mapping module 711. The visual effect module 711 also receives the information from image information 620d and calibration information 620c from splitting module 620 (see FIG. 6). Additionally, the visual effect module 711 receives the result from visual effect inference module 632 to fill in the gaps in the mapping of image information 620d i.e. any areas that are not visible in the video. The result is a map that provides the mapping of the mesh visual effect to the information in the image information 620d.

The visual effect map may optionally be processed in a padding, or dilation, module 712 to pad the visual effect map in known ways. The result is a visual effect image for each mesh i.e. frame of the sequence of meshes.

Once each frame of the sequence of meshes has been mapped, the refined registered sequence of meshes and the corresponding visual effect images are encoded separately. The visual effect images are processed in a visual effect encoding module 721 and the refined registered sequence of meshes are encoded in a mesh encoding module 722. The output of the visual effect encoding module is a discrete visual effect video. In a preferred embodiment, the mesh encoding module 722 uses a keyframe based approach to removed topology redundancy.

The output of the visual effect encoding module 721 and mesh encoding module 722 is then combined and compressed. The encoded visual effect video and the encoded meshes are then compressed into a moving volumetric image 73. The moving volumetric image 73 may then be distributed and viewed as described above.

Figure 8:
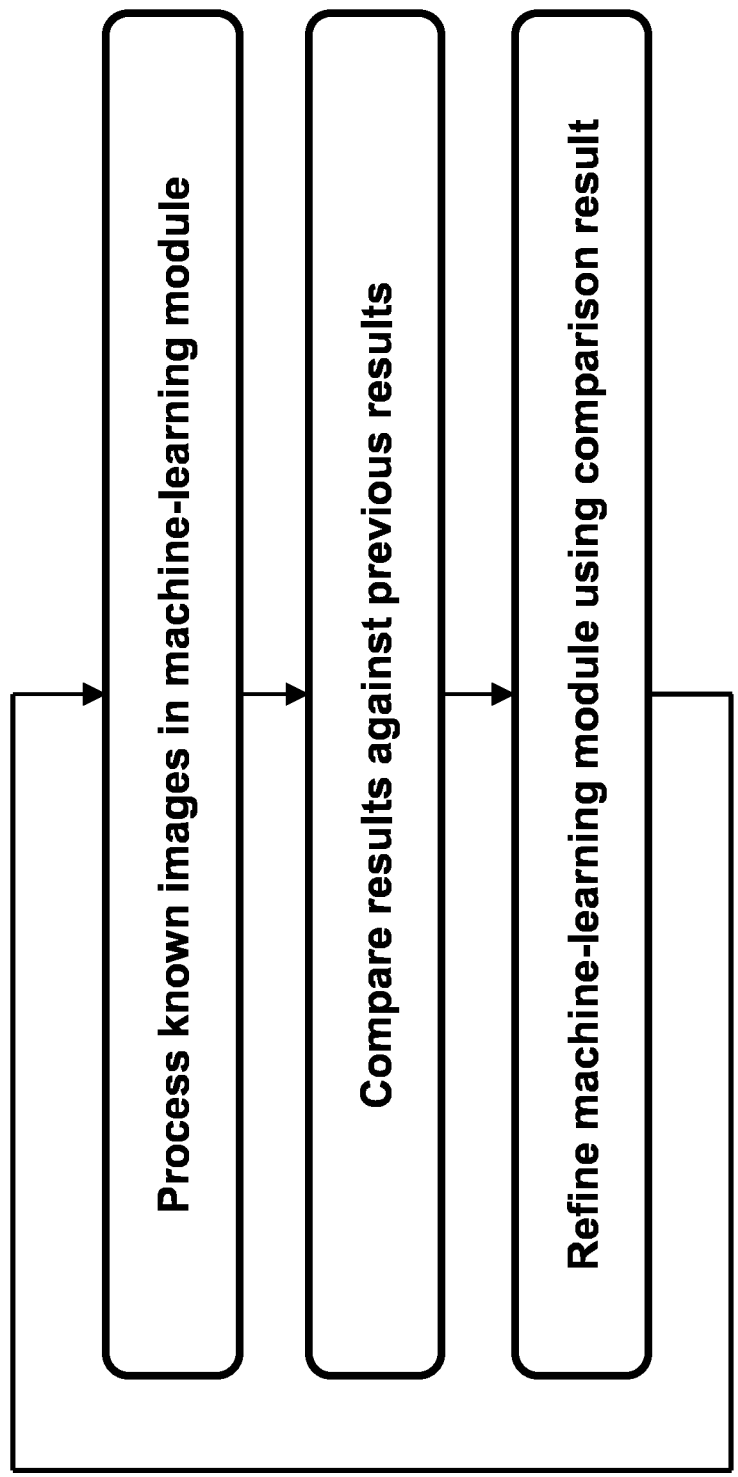
FIG. 8 shows a flow chart of the training for a machine-learning module.

The training of any of the machine-learning modules described above, e.g. any of the deep-learning modules, is shown in FIG. 8. The training data to train the machine-learning module may be obtained from large complex professional volumetric image capture apparatus, which produce high-quality results. In this way, each piece of training data will have a corresponding predetermined high-quality result.

For each piece of training data, the training data is processed by the machine-learning module that is to be trained. The evaluated results of the processing can then be tested against the predetermined high-quality results. The difference between the evaluated results and the predetermined results can be used to define an error signal. The error signal can be used to refine the operation of the machine-learning module. The training process is repeated until the machine-learning module is operating as required, or all training data has been processed.

As a lot of training data is required, especially when training deep-learning modules, the input training data may be modified to generate further training data. For example, the input images may be modified to deliberately introduce artefacts that are likely with user-held devices. As professional apparatus also acquire a lot of input data per capture, the input images may be a small selection of the acquired data. Thus, multiple training iterations can be performed for each image produced by the large complex professional volumetric image capture apparatus.

The invention claimed is:
1. A method for generating a moving volumetric image of a moving object from data recorded by a single user-held device comprising the following steps:
   acquiring input data, the input data comprising:
      video data of the moving object from at least two cameras in a stereo-camera configuration on the user-held device; and
      pose data for the user-held device; and
   communicating the input data to a computing module; and
   at the computing module:
      processing the video data to extract images that are segmented to form segmented images that delineate the moving object;
      processing the video data from the at least two cameras on the single user-held device to extract depth data from differences between data from the at least two cameras;
      passing the segmented images, depth data and pose data through a processing module to form a sequence of volumetric meshes defining the outer surface of the moving object;
      rendering the sequence of volumetric meshes with a visual effect at least partly determined from the video data to form a rendered moving volumetric image and partly determined by employing a deep-learning model-forming module to estimate visual effect of the volumetric image in hidden areas; and
      communicating the rendered moving volumetric image from the computing module to at least one device, the at least one device comprising the user-held device; and
   displaying, at a display of the at least one device, the rendered moving volumetric image received from the computing module, wherein displaying the rendered moving volumetric image received from the computing module comprises decompressing in runtime a compressed rendered volumetric image and then applying one or more visual effects to the decompressed volumetric image, at least one of the one or more visual effects being partly determined from the video data.
2. The method of claim 1, wherein the pose data is determined from the video data.

3. The method of claim 1, wherein communicating the rendered moving volumetric image from the computing module to at least one device comprises:
compressing the rendered moving volumetric image into:
a compressed moving volumetric image; and
one or more visual effects corresponding to the compressed moving volumetric image, at least one of the one or more visual effects being partly determined from the video data; and
communicating the compressed rendered volumetric moving image via a communication network.

4. The method of claim 3, wherein the computing module is running on one or more remote servers.

5. The method of claim 3, where the applied visual effect is either:
the visual effect communicated with the rendered moving volumetric image; or
one of a plurality of visual effects that is stored on the user-held device or received from a remote server.

6. The method of claim 1, wherein the processing module is further configured to:
track mesh elements in the sequence of volumetric meshes to form a tracking map; and
render the sequence of volumetric meshes by mapping the video data onto the mesh elements with the tracking map.

7. The method of claim 6, wherein mapping the video data onto the mesh elements with the tracking map comprises passing: at least part of the sequence of volumetric meshes, the tracking map, and the video data through a deep-learning visual effects module.

8. The method of claim 1, wherein the segmentation of the images from the video data is performed using a deep-learning segmentation module.

9. A non-transitory computer-readable medium encoded with instructions which, when executed by a computer, cause the computer to perform the following steps of:
acquiring input data recorded by a single user-held device, the input data comprising:
video data of the moving object from at least two cameras in a stereo-camera configuration on the user-held device; and
pose data for the user-held device; and
communicating the input data to a computing module; and
at the computing module:
processing the video data to extract images that are segmented to form segmented images that delineate the moving object;
processing the video data from the at least two cameras on the single user-held device to extract depth data from differences between data from the at least two cameras;
passing the segmented images, depth data and pose data through a processing module to form a sequence of volumetric meshes defining the outer surface of the moving object;
rendering the sequence of volumetric meshes with a visual effect at least partly determined from the video data to form a rendered moving volumetric image and partly determined by employing a deep-learning model-forming module to estimate visual effect of the volumetric image in hidden areas; and
communicating the rendered moving volumetric image from the computing module to at least one device, the at least one device comprising the user-held device; and displaying, at a display of the at least one device, the rendered moving volumetric image received from the computing module, wherein the displaying of the rendered moving volumetric image received from the computing module comprises decompressing in runtime a compressed rendered volumetric image and then applying one or more visual effects to the decompressed volumetric image, at least one of the one or more visual effects being partly determined from the video data.

10. A system comprising:
a single user-held device having at least two cameras configured as a stereo camera, wherein the user-held device is configured to acquire the input data from the stereo camera and wherein the user-held device is configured to:
acquire input data, the input data comprising:
pose data for the user-held device; and
video data of the moving object from the at least two cameras on the user-held device;
a computing module, wherein the user-held device is configured to communicate the acquired input data to the computing module, and wherein the computing module is configured to:
process the video data to extract images that are segmented to form segmented images that delineate the moving object; and
process the video data from the at least two cameras on the single user-held device to extract depth data from differences between data from the at least two cameras;
a processing module comprising a deep-learning model-forming module,
wherein the computing module is also configured to:
pass the segmented images, depth data and pose data through the processing module to form a sequence of volumetric meshes defining the outer surface of the moving object, wherein the deep-learning model-forming module is configured to estimate a visual effect of the volumetric image in hidden areas;
render the sequence of volumetric meshes with the video data to form the rendered moving volumetric image; and
communicate the rendered moving volumetric image from the computing module to at least one device, the at least device including the user-held device, wherein the user-held device is configured to display the rendered moving volumetric image received from the computing module, wherein the display of the rendered moving volumetric image received from the computing module comprises decompressing in runtime a compressed rendered volumetric image and then applying one or more visual effects to the decompressed volumetric image, at least one of the one or more visual effects being partly determined from the video data.

11. The system of claim 10, wherein the user device is configured to communicate the rendered moving volumetric image from the computing module to at least one device by:
compressing the rendered moving volumetric image into:
a compressed moving volumetric image; and
one or more visual effects corresponding to the compressed moving volumetric image, at least one of the one or more visual effects being partly determined from the video data; and
communicating the compressed rendered volumetric moving image via a communication network.

12. The system of claim 10, where the applied visual effect is either:
  the visual effect communicated with the rendered moving volumetric image; or
  one of a plurality of visual effects that is stored on the user-held device or received from a remote server.

13. The system of claim 10, wherein the processing module is further configured to:
  track mesh elements in the sequence of volumetric meshes to form a tracking map; and
  render the sequence of volumetric meshes by mapping the video data onto the mesh elements with the tracking map.

14. The system of claim 13, wherein processing module is further configured to map the video data onto the mesh elements with the tracking map by passing: at least part of the sequence of volumetric meshes, the tracking map, and the video data through a deep-learning visual effects module.

\* \* \* \* \*